(12) United States Patent
Clifford et al.

(10) Patent No.: US 10,467,240 B2
(45) Date of Patent: Nov. 5, 2019

(54) DATABASE MANAGEMENT SYSTEM

(71) Applicant: IMOSPHERE LTD, Nottingham (GB)

(72) Inventors: Paul Clifford, Nottingham (GB); Mark Robinson, Nottingham (GB); Toby Rogers, Nottingham (GB)

(73) Assignee: IMOSPHERE LTD, Nottingham (GB)

( * ) Notice: Subject to any disclaimer, the term of this patent is extended or adjusted under 35 U.S.C. 154(b) by 0 days.

(21) Appl. No.: 16/133,937

(22) Filed: Sep. 18, 2018

(65) Prior Publication Data

US 2019/0095080 A1 Mar. 28, 2019

Related U.S. Application Data

(63) Continuation of application No. 14/786,817, filed as application No. PCT/EP2014/058260 on Apr. 23, 2014, now abandoned.
(Continued)

(51) Int. Cl.
*G06F 7/00* (2006.01)
*G06F 16/248* (2019.01)
(Continued)

(52) U.S. Cl.
CPC .......... *G06F 16/248* (2019.01); *G06F 3/0482* (2013.01); *G06F 3/04842* (2013.01);
(Continued)

(58) Field of Classification Search
CPC .......................... G06F 16/3331; G06F 16/334
(Continued)

(56) References Cited

U.S. PATENT DOCUMENTS 10,140,333 B2 * 11/2018 Bourdoncle ........ G06F 16/2428
2010/0241645 A1 * 9/2010 Kandogan ........... G06F 16/9535
707/763
(Continued)

FOREIGN PATENT DOCUMENTS

GB 2293667 A 4/1996

OTHER PUBLICATIONS

Alessandro Micarelli et al.: "Personalized Search on the World Wide Web", Apr. 24, 2007 (Apr. 24, 2007), The Adaptive Web; [Lecture Notes in Computer Science;; LNCS], Springer Berlin Heidelberg, Berlin, Heidelberg; vol. 4321, pp. 195-230, XP019057882, ISBN: 978-3-540-72078-2; retrieved May 16, 2007; Figure 6.2.2, section "6.2.2 User Modeling in Personalized Systems" abstract.

*Primary Examiner* — Eliyah S. Harper
(74) *Attorney, Agent, or Firm* — Martensen IP

(57) ABSTRACT

A method of querying a database system, the database system comprising at least one database populated with a plurality of unique, multi-character expressions associated with the data entities of the at least one database, the method comprising: providing a graphical user interface for receiving at least one input selection from a user defining a database query expression; scanning the at least one database with the database query expression to obtain a first set of results; parsing the first set of results with a user profile expression associated with the user to obtain a second set of results, the user profile expression comprising a unique, multi-character expression; and displaying the second set of results in the graphical user interface.

10 Claims, 18 Drawing Sheets

Related U.S. Application Data

(60) Provisional application No. 61/814,876, filed on Apr. 23, 2013, provisional application No. 61/879,718, filed on Sep. 19, 2013.

(51) Int. Cl.
  *G06F 16/242* (2019.01)
  *G06F 16/2457* (2019.01)
  *G06F 3/0482* (2013.01)
  *G06F 3/0484* (2013.01)
  *G06F 16/33* (2019.01)

(52) U.S. Cl.
  CPC ...... *G06F 16/2425* (2019.01); *G06F 16/2428* (2019.01); *G06F 16/24575* (2019.01); *G06F 16/334* (2019.01); *G06F 16/3331* (2019.01)

(58) Field of Classification Search
  USPC ........................................................ 707/769
  See application file for complete search history.

(56) References Cited

U.S. PATENT DOCUMENTS

| | | | | |
|---|---|---|---|---|
| 2012/0030577 | A1* | 2/2012 | Akolkar | G06F 3/0484 715/738 |
| 2012/0278339 | A1* | 11/2012 | Wang | G06F 17/21 707/748 |
| 2013/0218355 | A1* | 8/2013 | Lazaris | F03G 6/00 700/291 |
| 2013/0282811 | A1* | 10/2013 | Lessin | G06Q 50/01 709/204 |
| 2013/0332862 | A1* | 12/2013 | Mirra | G06O 40/06 715/760 |
| 2013/0339404 | A1* | 12/2013 | Chao | G06F 17/5009 707/821 |
| 2014/0068404 | A1* | 3/2014 | Stiffler | G06Q 10/0639 715/227 |
| 2014/0136937 | A1* | 5/2014 | Patel | G06F 17/246 715/212 |
| 2014/0149403 | A1* | 5/2014 | Miller | G06F 3/04817 707/728 |
| 2014/0280203 | A1* | 9/2014 | Clark | G06F 17/2785 707/748 |
| 2016/0078104 | A1* | 3/2016 | Clifford | G06F 16/2425 707/722 |

* cited by examiner

Report Manager Group Manager

Welcome, firstname lastname

Reports

505

502 — Create New Report

| REPORT NAME → | REPORT TYPE | WHO | LAST RUN | NEXT RUN |
|---|---|---|---|---|
| All visits 2012 (12763) | Visits | All individuals | not yet | 24/03/2013 |
| All encounters - Dr Brooker | All the answers | au(45179) | 22/03/2013 | 24/03/2013 |

Report Manager  Group Manager

Welcome, firstname lastname

Groups

605

606 — Create New Group Definition

| GROUP NAME | PATIENTS IN GROUP | CREATED BY |
|---|---|---|
| ☐ ☒ All females with anxiety | 309 | Dr Brooker |
| ☐ ☒ Males >30 Diabetes | 213 | Carl Spence |
| ☐ ☒ Emergency Admissions | 35 | Hanna Rymer |
| ☐ ☒ Non-emergency Admissions | 47 | Dr Brooker |
| ☐ ☒ Diabetes this calendar year | 1092 | Dr Brooker |
| ☐ ☒ All visits 2002+ | 4627 | David Tipperlady |
| ☐ ☒ Females >20 Diabetes | 9 | Carl Spence |
| ☐ ☒ All emergency visits 2012 | 79 | Dr Brooker |

☑ Filter by date

Only include visits that occurred :

| Before | After | Relative | Between |

Include data recorded after [01/01/2013] 📅

1/1/2013 ... The end of time

Include visits within the time frame that: — 725
☐ Started but did not finish
☐ Finished but did not start
☐ Started and finished
☐ Overlapped but did not start or finish

Report Manager  Group Manager

Welcome, firstname lastname

Define New Group

Scope | Descriptive Filters — 730

Descriptive Filters

[ Select item ] from a dataset

Emergency admissions

Group Count

| CRITERIA | CHANGE | COUNT |
|---|---|---|
| Initial size | | 3440 |
| Scope | | |
| For EMERGENCY DEPARTMENT | -1944 | 1496 |
| For consultant Bankim | -1003 | 493 |
| Date filter | -87 | 406 | current size 406

[ Report on this Group ]

Report Manager   Group Manager

Welcome, firstname lastname

Define New Group

Scope | Descriptive Filters

Descriptive Filters

Include: [If ALL of the following apply ▼]

- Gender: Male ✕
- Diagnosis: > 5 ✕
- Medications: > 4 ✕
- Length of stay: > 3 days ✕
- Charges: > $17,000 ✕

Emergency admissions

Group Count

| CRITERIA | CHANGE | COUNT |
|---|---|---|
| Initial size | | 3440 |
| Scope | | |
| For EMERGENCY DEPARTMENT | -1944 | 1496 |
| For consultation Barolm | -1003 | 493 |
| Date filter | -87 | 406 |
| Gender: Male | -129 | 277 |
| Diagnosis: > 5 | -52 | 175 |
| Medications: > 4 | -17 | 158 |
| Length of stay: > 3 days | -10 | 148 |
| Charges: > $17,000 | -20 | 128 | current size 128

Report on this Group ▸
☑ ALL the Answers

DATABASE MANAGEMENT SYSTEM

RELATED APPLICATION

The present application is a continuation of, and claims the benefit of priority to, U.S. patent application Ser. No. 14/786,817 filed 23 Oct. 2015 which in-turn claims priority under section 371 to PCT/EP2014/58260 filed on 23 Apr. 2014 which in-turn claims priority to U.S. Provisional Patent Application Nos. 61/814,876, filed 23 Apr. 2013 and 61/879,718 filed 19 Sep. 2013, all of which are hereby incorporated by reference in their entirety for all purposes as if fully set forth herein.

TECHNICAL FIELD

The present invention relates to database systems, in particular to a database system which provides an interface database with a hierarchical tree-like structure using data from a plurality of other databases. This database system enables fast and comprehensive data extraction, querying and output display functions from databases which may be based on different database models.

BACKGROUND

A database model is a theory or specification describing how a database is structured and used. A data model is not just a way of structuring data: it also defines a set of operations that can be performed on the data such as queries. Several such models have been suggested such as Hierarchical model, Network model, Relational model (the most popular model), Entity-relationship model, Object-relational model, Multivalue model, Object Model and Document model.

As is well known, there is a lack of standardisation of database models and systems such that different organisations use different database models or even different departments within an organisation (e.g., the Health Service) use different database models. Each organisation or department generally chooses the database model considered most suitable for them or simply accepts the database model recommended to them by their IT department or database manager/administrator. Furthermore it is generally not possible to manage databases having different database models using one database management system.

Well known database models and systems include those provided by Oracle™, Microsoft™, Sybase™, IBM™ and the like. Each differ in specifics and typically require an expertise in maintaining and interrogating data within their defined data structures.

An innovative database management system that offers considerable benefits over the relational database model or system referred to above has been described in GB 2293697B and GB 2398143B the content of which is incorporated herein by way of reference. However the use of the database management systems of these GB patents implied that the previous database models and systems such as the relational database model and system should be simply replaced with the proposed database system. As can be well understood, replacing the databases of an entire organisation such as a large healthcare provider, or multiple smaller organisations to use the database system of the GB patents would be no easy task.

It is an object of the present invention to provide a solution to some or all of the above problems.

SUMMARY

Accordingly, the present teaching provides a database system which configures a database model with a hierarchical tree-like structure using data from a plurality of databases. The plurality of different databases can each be structured according to a different database models. By providing an intermediary data structure (database) between a user of the databases and the stored data the present teaching recognises that multi-character expressions can be adapted and used to provide access to data stored within each of the different database models through use of a single interrogatory syntax.

In accordance with the present teaching the intermediary data structure is provided as a storage model based on a conceptual data model in accordance with a hierarchical structure. Every entity, every attribute and every entity occurrence within each of the underlying databases is assigned a unique, multi-character expression which defines the relationship between each entity, attribute and entity occurrence with every other entity, attribute and entity occurrence in the database and may also uniquely define an attribute value to an occurrence of an entity. The expressions are stored in an expression set table linking each element of each expression with a natural language phrase relating the expression to a hierarchical level and a position in a data model. The "expressions" used are multi-character expressions conveniently divided into a number of "words", each of a number of bytes.

Each multi-character expression indicates a context (in the data model), a specification (e.g. a description/definition of the data being encoded) and a quality (e.g. actual data values or pointers thereto). Where any of these components are unknown or irrelevant, a wildcard character or "non-deterministic" character can be used. A feature of the expressions used to describe the data model is that similar data structures can be replicated throughout the main tree of multi-character expressions by changing only selected characters in the expression. Such an arrangement is similar to that discussed in detail in the patent GB 2293667B, and in subsequent related patent GB 2398143B, and as is clear from the disclosure of these earlier applications, the use of these multi-character expressions to store data in a database offers extremely fast searching and context switching capability when accessing data from the database.

Furthermore, the multi-character expression approach to data storage in intermediary data structure provides a flexible data-driven method of managing access to patient information at the most granular level. This is achieved by the present teaching providing access to data by a user within the above outlined system via multi-character expression "views" of that data.

In particular, the present teaching provides a method of querying a database system, the database system comprising at least one database populated with a plurality of unique, multi-character expressions associated with the data entities of the at least one database, the method comprising:

providing a graphical user interface for receiving at least one user input selection defining a database query expression; scanning the at least one database with the database query expression to obtain a first set of results; parsing the first set of results with a user profile expression associated with the at least one user input selection to obtain a second set of results, the user profile expression comprising a unique, multi-character expression; and displaying the second set of results in the graphical user interface.

BRIEF DESCRIPTION OF THE FIGURES

The present invention will now be described by way of example, and with reference to the accompanying drawings in which:

FIG. 5 shows a screen shot of the report manager feature in accordance with the present teachings;

FIG. 6 shows a screen shot of the group manager feature in accordance with the present teachings;

FIGS. 7A and 7B show, when combined, a screen shot of the group manager feature wherein the user can define, in FIG. 7A, the scope of a new group in accordance with the present teachings, and in FIG. 7B, a filter by date feature, in accordance with the present teachings;

FIG. 8 shows a screen shot of the group manager feature wherein the user can select the descriptive filters of a new group from a dataset in accordance with the present teachings;

FIG. 9 shows a screen shot of the group manager feature wherein the user can choose the descriptive filters of a new group in accordance with the present teachings;

FIGS. 11A and 11B show, when combined, a screen shot of the group manager feature wherein a user has selected the "Report on this Group" option in accordance with the present teachings;

FIG. 14 shows a screen shows a screen shot of the report manager feature wherein "Apply Safe Harbor de-identification" option is selectable

DETAILED DESCRIPTION

Figure 1:
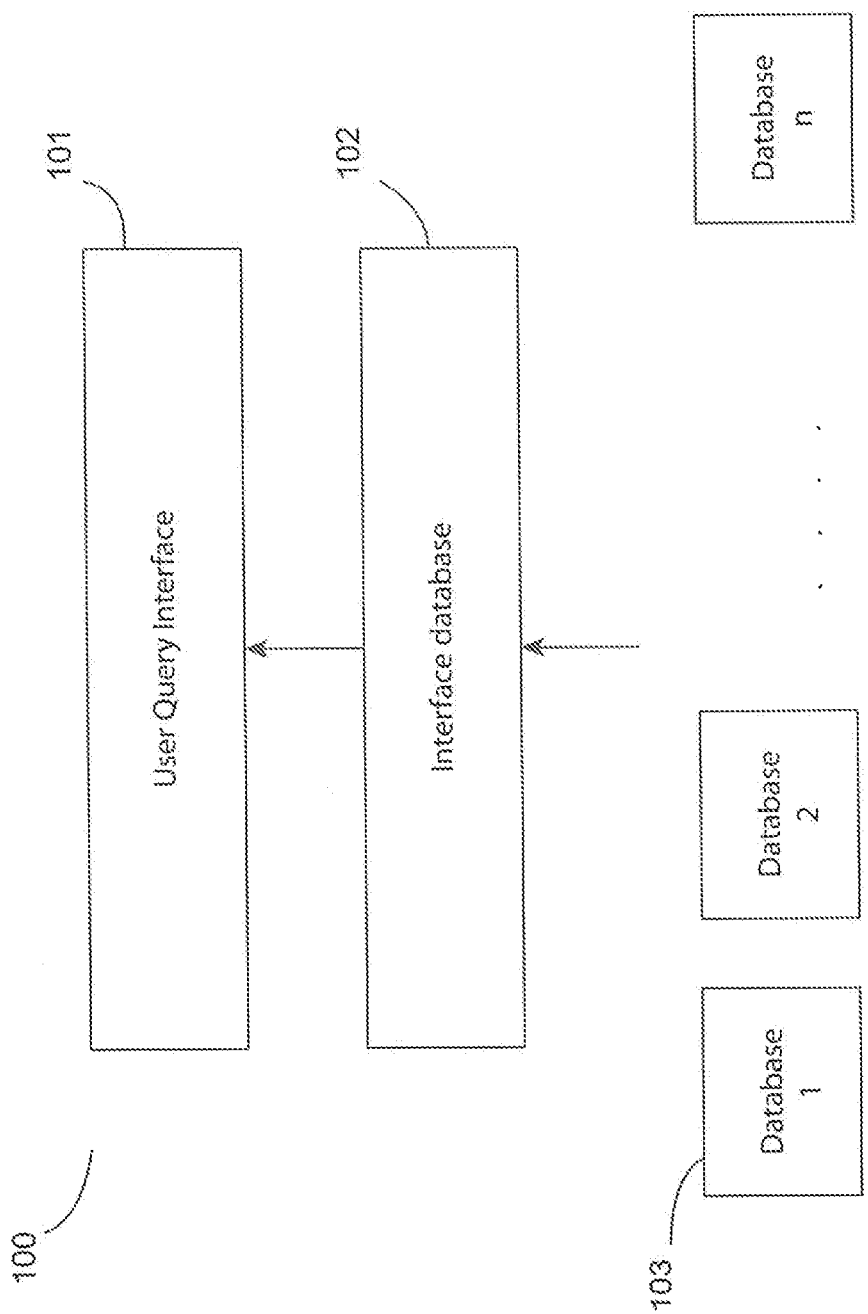
FIG. 1 shows an exemplary database system described in accordance with the present teaching.

In order to overcome the limitations of the current state of the art there is provided in the present application a method of operating a database system. FIG. 1 depicts such a database system 100. It can be seen that access to a plurality of databases 103 is provided. Furthermore each of the databases 103 can have a structure based on a respective database model. Any conventional database model can be used for databases 103 e.g., the above mentioned relational model etc. As is well known to those skilled in the art each database stores a plurality of data entities having attributes and occurrences within the structure of the database.

Although a plurality of databases 103 are shown in FIG. 1, a single database 103 can also be used. Furthermore, when using a plurality of databases 103, at least two can differ in their database management system such that each database management system defines a set of programs that enable a user to store, modify, and extract information from the respective database.

The database management systems used for the databases 103 can be selected from one or more of those provided by Oracle, FoxPro, IBM DB2, Linter, Microsoft Access, Microsoft SQL Server, MySQL, PostgreSQL and SQLite.

Database system 100 also includes an interface database 102, whereby the interface database 102 is populated with a plurality of unique, multi-character expressions associated with the data entities of the at least one database 103. Details of the structure of this interface database 102 are described in more detail below.

Also shown in FIG. 1 is a graphical user interface (GUI) 101. The graphical user interface 101 is configured to effect generation of database query expressions. It can be understood that one of the main objectives of the present teachings is to allow a user to access data stored in the plurality of databases 103 without using the database management system specific to the plurality of databases 103 but rather using the interface database 102 accessed through the graphical user interface 101. This takes advantage of faster searching and context switching capability of the interface database 102 and is a clear advantage over simply querying the databases 103 directly as will be become apparent hereinafter.

In order to achieve the aforementioned objective of the present teachings—allow a user to access data stored in the plurality of databases 103 using the interface database 102 accessed through the graphical user interface—then the data stored in the plurality of databases 103 must be converted into unique, multi-character expressions for storage in the interface database 102. The details of implementing such a conversation can be chosen as appropriate by one skilled in the art. However, one possible implementation involves iteratively accessing data within the plurality of databases 103 to convert data not already converted and stored as unique, multi-character expressions in the interface database 102 to unique, multi-character expressions for storage in the interface database 103. The frequency of these intervals can be set by the interface database 102 administrator/manager as appropriate. For example, where data is not frequently altered/updated in databases 103 then interface database 102 can be updated during quiet processing times such as during the night. Another possible implementation for updating the interface database involves updating the interface database 102 each time data on one of the plurality of databases 103 is updated such that the interface database 102 is updated on a determination that one of the plurality of databases 103 has been updated. However, where one or more of databases 103 exists in a high volume data changing/altering environment then this can place an undesirable load on the processing resources of the interface database 102. It can also be understood that maintaining the plurality of databases 103 can occur concurrently with maintenance of the interface database 102.

Furthermore, the plurality of databases 103 and the interface database 102 do not have to be provided at the same geographical location and usually such that at least one of the databases 103 and interface database 102 can be provided as a cloud database.

Turning to a more detailed discussion of the structure of the interface database 102, a plurality of unique, multi-character expressions are defined by assigning to every entity, every attribute and every entity occurrence a unique, multi-character expression, the expression having a predetermined hierarchical structure which defines the relationship between each entity, attribute and entity occurrence with every other entity, attribute and entity occurrence in the second database.

Figure 2:
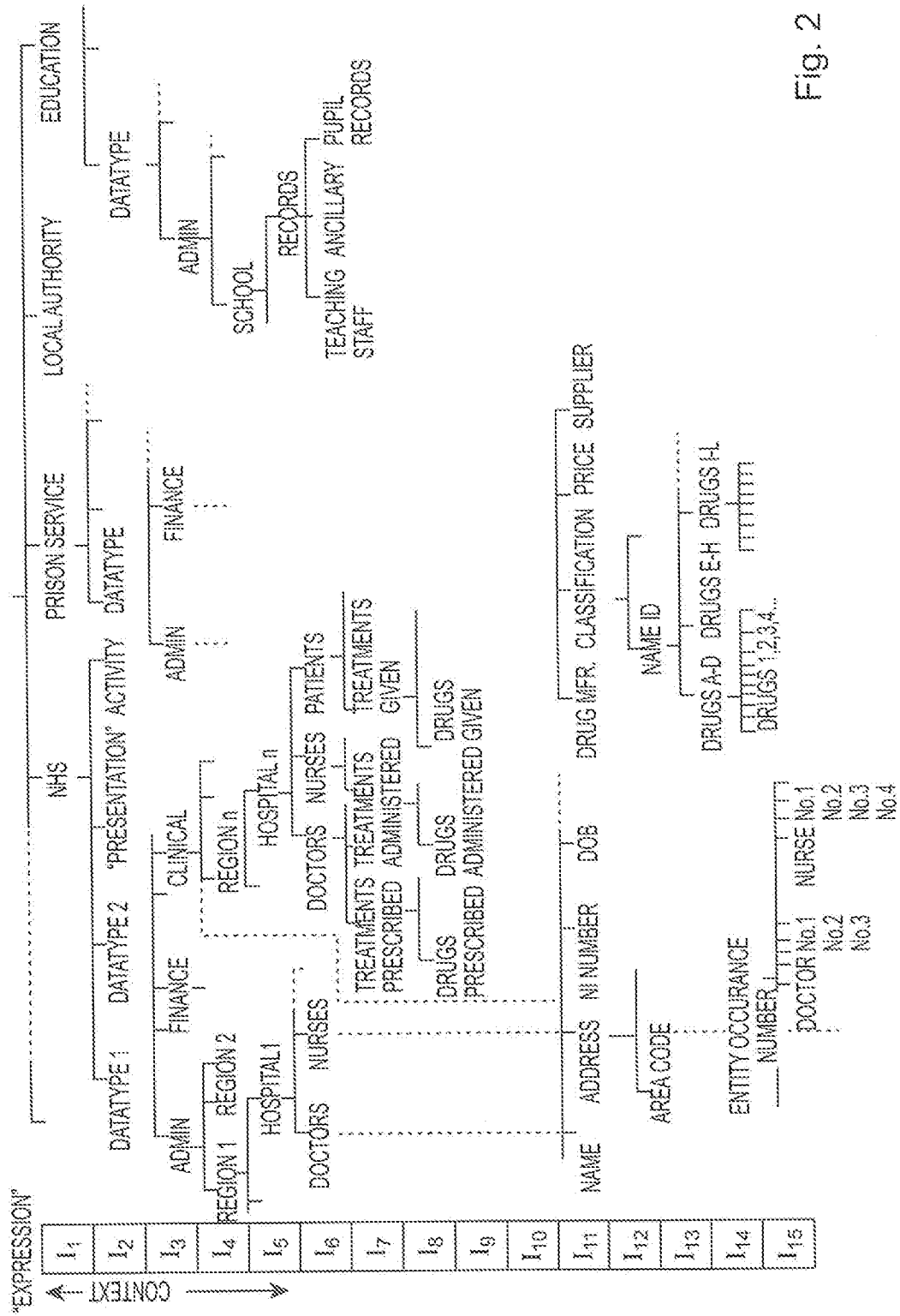
FIG. 2 shows an exemplary data model of the interface database.

The way in which the database structure of the interface database 102 is imposed by the assignment of these expressions is best described with reference to an exemplary data model as shown in FIG. 2.

The tree structure in FIG. 2 represents the complete data model. Each hierarchical level of the data model is shown horizontally across the tree structure, and each one of these hierarchical levels may be represented by an appropriate byte $I_1$, to $I_{15}$ of the expression shown vertically on the left hand side of the drawing. It will be understood that the number of bytes representing a character in the expression, or the length of the overall expression, can be varied according to the requirements of a particular system. At the highest level of the tree $I_1$, context information is shown defining the organisation from which the data was provided, for example the National Health Service (NHS), Prison Service, Local Authority, Educational Establishment etc.

It can be understood that the data for constructing the interface database 102 is provided from respective databases for each of the National Health Service (NHS), Prison Service, Local Authority, and Educational Establishment. In particular, it should be understood that each of these organisation uses at least one database corresponding to the databases 103 of FIG. 1. However, it should also be understood that the database system 100 can be directed to one of these organisations e.g., National Health Service (NHS) such that at the highest level of the tree $I_1$, context information is shown defining the department or section of the NHS from which the data was provided.

As outlined above, the first byte $I_1$ in every multi-level expression to designate the organisation or database installation from which data is being imported. This enables simple use of filters and masks relating to this byte, for example to prevent or enable one organisation querying the receiving database from viewing data belonging to another organisation etc. Obviously, once data has been collated in the interface database 103 from the plurality of databases 103 access to portions of the imported data must be limited. For example, a user of the interface database 103 should not be able access all the data across multiple organisations. In particular, a user of the interface database 103 who is only permitted to query or access files related to the health service will have the first byte $I_1$ restricted to that used by the health service. Therefore, any query that the user makes is limited to only the health service i.e., only data of the health service is searched. Further restrictions can be placed on the user by restricting other bytes further down on the multi-character expression such that a user is restricted to queries within departments of an organisation. Ensuring information security and user authorization is particularly relevant when dealing with medical records of individuals. For example, the The Health Insurance Portability and Accountability Act of 1996 placed particular importance on the privacy of individuals' medical records. The inventors of the present application have found that the database system described herein has broad ranging applications in the medical/healthcare field and ensuring that private health information (PHI) is secure is tantamount. As more comprehensive approach to ensuring security of PHI is discussed in detail with regard tables 1 and 2 as well as FIG. 13.

The significance of byte $I_2$ is discussed in more detail in GB 2293697B and GB 2398143B, but broadly speaking indicates a data type from a plurality of possible data types that might be used.

Within each organisation (e.g. the Health Service or health administration organisation) there may typically be a number of departments or functions or data view types (represented by byte $I_3$) such as administration, finance/accounts and clinical staff, all of whom have different data requirements. These different data requirements include:

a) different data structures or models pertaining to different organisational hierarchies within the department;

b) different views of the same entities and occurrences of entities; and c) the same or different views of "standard format" data relating to different occurrences of similar or identical entities or attributes.

The interface database 102 must be able to accommodate these differences in the underlying organisations/departments and their corresponding databases. The significance of this to the present teaching will become clear as one progresses downward through the hierarchy.

Each department may wish to segregate activities (e.g. for the purpose of data collection and analysis) to various regional parts of the organisation: e.g. a geographically administered area or a sub-department. This can be reflected in the structure of the second database 102 by expression byte $I_4$. Each geographically administered area may further be characterized by a number of individual unit types, such as: (i) hospitals, health centres etc. in the case of an a health service application; (ii) schools or higher education institutions in the case of an education application; (iii) prisons and remand centres in the case of the prison service application.

Each of the organisations and units above will have different data structure requirements (as in (a) above) reflecting different entities, attributes and entity relationships within the organisation and these are provided for by suitable allocation of codes within the $I_6$ to $I_{10}$ range of expression bytes. In this case, the same alphanumeric codes in bytes $I_6$ to $I_{10}$ will have different meaning when in a branch of the tree under for example a structure such as that provided by the National Health Service (NHS) in the UK, than when under, e.g. the education branch, even though they exist at the same hierarchical level. As an example, the sub-tree structure represented by particular values of bytes $I_6$ to $I_{10}$ may refer to patient treatment records in the NHS context, whereas those values of codes may refer to pupil academic records in the education context.

However, in the case of (b) above, where the organisational unit requires the same or different views of the same entities, attributes and occurrences of entities as other organisational units, the codes in bytes $I_6$ to $I_{10}$ of one branch of the tree will represent the same underlying structure and have the same meaning as corresponding byte values under another branch of the tree. An example of this is where both the administration departments and the finance departments require a view of the personal details of the staff in the hospital, both doctors and nurses. Note that the views of the data may be the same or different for each department, because the view specification is inferred from the higher level $I_1$ to $I_5$ fields. In this case, for entities, attributes and occurrences of entities which are the same in each sub-branch, some or all of the codes $I_1$ to $I_5$ which identify each entity occurrence will have identical values.

In the case of (c) above, i.e. the same or different views of standard format data relating to different occurrences of similar or identical entities and their attributes, it will be understood that a number of predefined bytes require the same specification regardless of the particular organisation using them. For example, a sub-tree relating to personnel records, and including a standard format data structure for recording personnel names, addresses, National Insurance numbers, sex, date of birth, nationality etc. can be replicated for each branch of the tree in which it is required. For example, all of the organisations in the tree will probably require such an employee data sub-tree, and thus by use of standardised codes in bytes $I_6$ to $I_{10}$ such organisational sub-trees are effectively copied into different parts of the tree. However, in this case, the context information in fields $I_1$ to $I_{15}$ will indicate that within each organisation, we are actually dealing with different occurrences of similar format data.

The tree structure defined by the expressions $I_1$ to $I_{15}$ can be used to define not only all entity types, all entity attribute types and all entity occurrences, but can also be used to encode the actual attribute values of each entity occurrence where such values are limited to a discrete number of possible values. For example, in the sub-tree relating to treatments in the hospital context, "drug" is an entity which has a relation with or is an attribute of, for example: doctors (from the point of view of treatments prescribed); patients (from the point of view of treatments given); administration (from the point of view of maintaining stocks of drugs) and so on. The entire set of drugs used can be provided for with an expression to identify each drug. In an illustrative embodiment, the parts of the expression specific to the occurrences of each drug will be located in the $I_1$ to $I_{15}$ fields as shown in FIG. 2. Thus when used in conjunction with the appropriate fields $I_1$ to $I_{10}$ it will be apparent whether the specified drug is in the context of a treatment prescribed by a doctor, a treatment received by a patient, or a stock to be held in the hospital pharmacy.

Further bytes in the expression, lower in the hierarchy can be associated with the drug to describe, for example, quantities or standard prescription types. It will be apparent whether the expression refers to a prescribed quantity or a stock quantity by reference to the context information found higher in the hierarchy. In practice, the number of discrete values allowed for each of these grouped "entity values" using the five fields $I_1$ to $I_{15}$ is approximately $200^5=32 \times 10^{11}$. The number of permutations allowed can actually be expanded indefinitely, but in practice this has not been found to be necessary. It is noted, however, that the described model of FIG. 2 merely illustrates a principle of the data model. In an alternatively preferred embodiment, twenty-character expressions are used and the semantic significance of specific fields therein ($I_1$ to $I_{20}$) may differ significantly from those presently described in connection with FIG. 2. For example, in the alternative preferred model, "entity values" can occupy each of the two-byte elements $I_{13}$ to $I_{20}$, thereby allowing $65536^8$ discrete values ($=3.4 \times 10_{38}$).

Thus, in the fifteen character expression $I_1$ to $I_{15}$, each character represents a natural language expression (e.g., English language expression) defining some aspect of the data model, and by travelling downward through the table it is possible to compose a collection of natural language expressions which represents the complete specification of an entity, an attribute or an entity occurrence.

Although FIG. 2 has been described with reference to the highest level of the tree $I_1$ being the NHS, prison service, local authority etc., and the present teachings should not be construed as being limited to such a configuration. As previously mentioned the inventors of the present application have found that the database system described herein has broad ranging applications in the medical field and particularly in building a new kind of healthcare analytic software. Therefore, the top level of the tree could easily be a plurality of individual hospitals, health centres while the lower levels of the tree could be individual departments within the hospital such as oncology, orthopaedics etc. It is readily apparent that a number of other configurations are possible such as the top level of the tree representing individual departments within a single hospital or health centre.

Referring again to FIG. 1, the interface database 102 is also configured to store said multi-character expressions in an expression set table linking each element of each expression with a natural language phrase relating the expression to a hierarchical level and a position in a data model.

Figure 3:
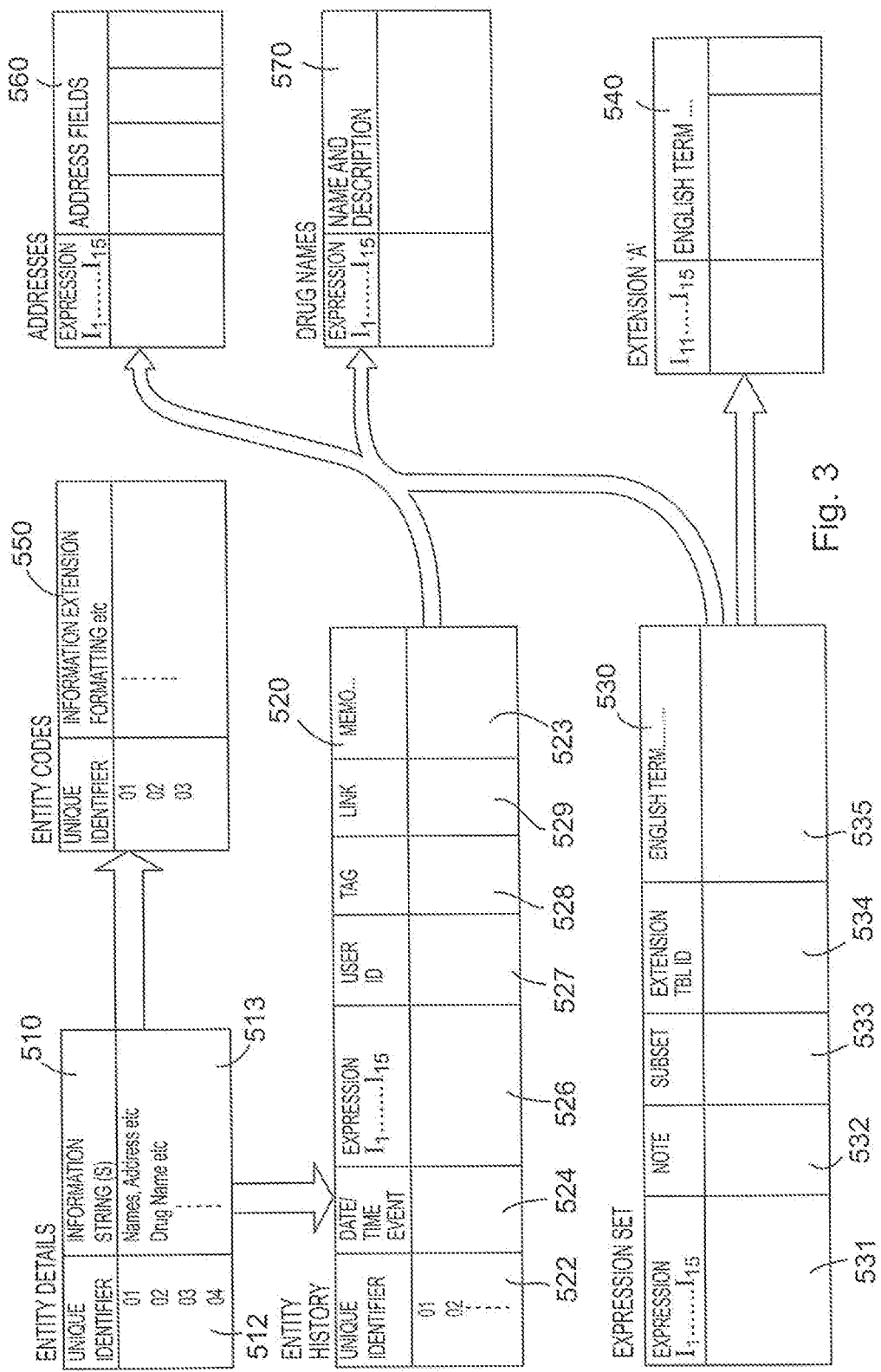
FIG. 3 shows an overview of the use of an expression set together with the implementing tables of the database system of the present teaching.

An overview of the use of an expression set together with the implementing tables which comprise an illustrative embodiment of the database system of the present invention is now described with reference to FIG. 3.

Every occurrence of an entity about which information must be stored is recorded in the entity details table 510. Each occurrence of each entity is given a unique identifier 512 which is assigned to that entity occurrence, and information about the entity is stored as a value expression information string 513. Examples of value expressions are the character strings giving names, street addresses, town, county, country etc., or drug name, manufacturer's product code etc. These details are essentially alphanumeric strings which themselves contain no further useful hierarchical information and are treated solely as character strings.

The unique identifier 512 of each entity occurrence in the entity details table 510 provides a link to an entity history table 520 where entry of, or update to the entity occurrence status is stored. In this table, the event updating the database is given a date and/or time 524, an expression 526, and the unique identifier 522 to which the record pertains, and may include other information such as the user ID 527 of the person making the change.

In the entity history table 520, various details of the event being recorded may not be available, or may have no relevance at that time. For example, a new patient in a designated hospital may be admitted, and some details put on record, but the patient is not assigned to any particular doctor or ward until a later time. Additionally, some information may be recorded which is completely independent of the user view or other context information. Thus the event is logged with only relevant bytes of the expression encoded. Bytes for which the information is not known, or which are irrelevant to the event are non-deterministic and are filled with the wild card character, "#".

The entity history table 520 may also include an event tag field 528 which can be used in conjunction with a corresponding field in an episode management table to be described hereinafter. It will indicate which coding activity was being carried out when the expression was assigned to the entity. For example, this tag could indicate whether the coding was carried out during an initial assessment, an update, a correction, a re-assessment, etc. This tag also orders entity codes into event groups. For example, in the medical context, when a person enters the system as a patient, they initiate an admission. An episode can have many spells, (such as a period of treatment on ward A, followed by a period on Ward B) and a spell can consist of many events (such as contacts with the attending physician, procedures, tests). What is more, a patient can be involved with more than one episode at a time (for example outpatient episodes with different hospitals pertaining to different illnesses), and under each episode, more than one spell at a time (e.g. involvement with more than one department of each hospital, each dealing with different aspects of each illness). Many organisations need to store this sort of information for costing and auditing purposes. By coding this information into an expression, it will be possible to browse this information.

The entity history table may also include a link field 529 which is designated to link related groups of codes allocated during a particular entity-event-times. For example, in a social services application, a home visit, a visit date, miles travelled and the visitor could all have an expression associated with the visit event. The link field will link these expressions together. Alternatively, the event tag field may also cater for this function.

A memo field 523 may also be included in the entity history table to allow the user to enter a free text memorandum of any length for each code allocated to an entity. In effect, every time a field is filled, a memo can be added.

The expression set of the entire database is recorded in a third table, the expression set table 530. This encodes each expression against its natural language meaning, and effectively records the data model as defined by the hierarchical structure of FIG. 2. There is a natural language meaning for each byte of the expression, each byte representing a node position in the data model tree, and the precise significance of every occurrence of every entity or attribute is provided by concatenating all natural language meanings for each byte of the expression: e.g. and again in the context of the NHS in the United Kingdom,—Presentation Data Type—Administrator's View—Region 1—HospitalNo2—Doctor Record—Name—DoctorID1.

The expressions may include expression extensions which map a sub-tree onto the main tree as are discussed in more detail in aforementioned GB 2293697B and GB 2398143B. For convenience, these extension expressions can be located within the expression set table 530 (the extension entries being identified by the byte $I_1$, or could be located in a supplementary table (not shown), in which the pointer fields $I_{11}$ to $I_{15}$ of the main expression are used as the first fields $I_1$ to $I_5$ of the extension expression.

The entity history table 520 and the expression set table 530 may each include an extra field holding a version code. In the entity history table, this would indicate a version number of the expression in use at the time the record was created; in the expression set table, expressions may be varied over time according to the version code given. This allows the structure of the hierarchy to change over time without necessarily introducing new expressions. This assists in maintaining backward compatibility of recorded data.

In use, the database management system first constructs the data model tree structure in the expression set table 530, with each expression being allocated a corresponding natural language term. This can be done by dialogue with the user, or by systems analysis by an expert. Preferably, preformatted codes representing certain data structures are used or useable by many different users. For example, personnel file type structures may be used by many different organisations. This allows compatibility of databases to allow data sharing between organisations, with users being allocated blocks of codes for their own user-specific purposes, as well as using shared codes which have already been defined by a higher authority.

In constructing the table, for implementation reasons discussed later, it is highly desirable that the table is maintained in strict alphanumeric order of expressions, with discontinuities between higher and lower tree branches filled in with blank specification lines. It will be understood that these correspond to particular levels within the tree structure for which there are no divisions of branches.

Additional fields may be included in the expression set table. For example, a note flag field 532 may be used to signify that explanatory information is available for a term. This would typically provide a pointer to a notes table. A symbol in this field could indicate the existence of, for example, passive notes (information available on request); advisory notes (displayed when the code is used); and selection notes (displayed to the user instead of the natural language term). A sub-set field 533 may also be provided for expression maintenance tasks, but these are not discussed further here.

When an expression set table has been constructed, it can be related to individual entity occurrences in the following manner. As previously discussed, the unique occurrences of entities can be placed in the entity details table 510, each having a unique identifier 512. This is linked to the expression set table, and thus to the tree via the entity history table. This records the entity unique identifier 512 in a column 522 and links this with the appropriate expression or part expression 526. The date of the event is logged in field 524, and other details may be provided—e.g. whether the data entry is a first registration of a record, whether it is a response record (e.g. updating the database) etc.

Other tables may be used beyond those described in connection with FIG. 2, or the tables structured differently. In one embodiment, the expression set in table 530 is used to identify entities and attributes of entities, together with individual occurrences of entities that do not change over time. Details of occurrences of entities that are transient to the data model may be recorded in a separate table, such as the entity history table 520. Such transient objects may be, for example, individual personnel whose existence in the data model is impermanent or whose function (place) within the data model may change over time (e.g. by promotion of staff or transfer within the organisation). In this instance, the unique identifier 522 and date/time field 524 relative to the expression field 526 indicate the function of that entity occurrence at that time.

The entity ID table 550 (FIG. 2) is an example of a secondary table which is used when communicating and sharing data with other systems. This table matches the entity unique identifier ID codes with entity ID codes used by other systems.

It is also possible to record static entity details in a form which is structured ready for input and output. For example, name, address and telephone records may be stored in successive columns of an address table 560, each record cross-referenced to the main data structure by the expression code or cross-referenced to an entity by the expression code $I_1$ to $I_{15}$. The link can thus be made with either the expression set table 530 or the entity history table 520. Then, whenever that branch of the tree is accessed pertaining to one individual record, the full static and demographic details of that entity occurrence may be accessed from a single table.

A similar arrangement is shown for providing detailed drug information, by drug table 570.

A further modification may be made to the embodiments described above in respect of the use of the entity details table 510. It is not essential for all information about an entity occurrence to reside in the entity details table 510.

In some models, it is advantageous to restrict the use of the entity details table 510 to that of a "major entity" only—the most significant entity forming part of the modelled organisation. For example, in the hospital environment, the patient could be chosen as the major entity. In this case, all other (non-structural, character-string) information about entities can be located in an appropriate field of either the entity history table 520, or the expression set table 530. In the case of the entity history table 520, an appropriate field to use is the memo field 523, and in the case of the expression set table 530, an appropriate field to use is the natural language term field 535. It will thus be understood that, where the non-structural information held about even the major entity is small, the entity details table 510 can be dispensed with all together.

As can be seen from FIG. 1, the database system 100 also includes a graphical user interface 101, the graphical user interface 101 being configured to receiving a user selection defining a database query expression, the database query expressions being parsed only against the interface database 102 to affect a return of data reflective of the data query expressions.

A database system provided in accordance with the present teaching offers significant advantages in the execution of database querying functions as hereinafter described. In particular, the present teachings offer advantages in reporting and database querying particularly for users have different respective assigned roles as will be explained in more detail herein.

To create a query, the database system defines a query expression comprising fifteen bytes ($I_1$ to $I_{15}$) which correspond with the expressions as stored in the entity history table 520 and expression set table 530. The query expression will include a number of deterministic bytes and a number of non-deterministic bytes. The non-deterministic bytes are effectively defined as the wild-card character "#"—"matches anything". The deterministic bytes are defined by the query parameters.

For example, a simple query might be: "How many patients are presently registered at hospital X". To answer this query, the query expression imposes deterministic characters in fields $I_1$, (=NHS), $I_4$ (=hospital identity), $I_6$ (=patients). Other context information may be imposed by placing deterministic characters in bytes $I_2$ (=presentation information). All other bytes are non-deterministic and are set to "#". The database scans through the expression set table matching the deterministic characters and ignoring others. It should be noted that in the preferred embodiment, the expression set table is maintained in strict alphanumeric sequence and thus very rapid homing in on the correct portions of the database table is provided where high-order bytes are specified. This will normally be the case, since the hierarchical nature of the expression set will be arranged to reflect the needs of the organisation from which the data was retrieved. The database system can then readily identify all the tuples of the expression set table providing a match to the query expression.

A significant advantage of the database structure will now become evident. The answer to the initial query has effectively homed in on one or more discrete portions of the expression set table and counted the number of tuples matching the query expression. Supposing that the user now requires to "progressively query" by stipulating additional conditions: "How many of those patients are being prescribed drug Y" requires only the substitution of the non-deterministic character "#" with the appropriate character in the requisite field In of the expression to change the result. Similarly, carrying out statistical analysis of other parameters, such as: "How many patients were treated by doctor Z with drug Y" can rapidly be assessed. It should be understood that progressively narrowing the query will eventually result in all bytes of the query expression becoming deterministic and yielding no match, or yielding a single patient entity match whose details can then be determined by reference to the entity details table 510 (or the appropriate memo field).

It should now be clear that the key to the speed of result of the statistical querying function is the construction of the expression set table. When imposing conditions on various attributes of an entity, i.e. by setting a deterministic character in a byte of the query expression, the relevant data will be found in portions of the table in blocks corresponding to that character. Progressive querying requires only scanning portions of the table already identified by the previously query. Even where a higher level context switch takes place, relevant parts of the expression set table can be accessed rapidly as they appear in blocks which are sequenced by the expression hierarchy.

Scanning the table can be achieved most efficiently by recognising that only the highest order, deterministic byte of the query expression need be compared with corresponding bytes of each record in the expression set table until a first match is obtained. Thereafter, the next highest order byte must be included, and so on until all deterministic bytes are compared. This results from maintaining a strict alphanumeric ordering to the table.

Another type of querying relates to examining the historical aspects of the database through the use of entity history table 520. For example, the query may be, "In the last year, what drugs and quantities have been prescribed by doctor X" ? To answer this query, the query expression is formulated in the same manner as before with regard to the expression set table 530, imposing deterministic bytes in the appropriate places in the query expression. This will include one or more "lowest order" bytes in $I_{11}$ to $I_{15}$ which actually identify a doctor, and non-deterministic characters against the drug fields. This time, however, the entity history table 520 is scanned, in a similar manner, seeking only matches of deterministic characters. In a preferred embodiment, the entity history table 520 will be maintained in chronological sequence and thus the search can be limited to a portion of the table where date limitations are known and relevant. Matches of deterministic characters will be found throughout the table where a relevant event relating to prescription of a drug by doctor X is found. Note that the entity history table 520 may include other fields which can be used to impose conditions on the query, such as the user ID of the person entering the record.

A further type of querying relates to analysis of the records pertaining to a single entity value: the entire medical record of patient X. In the preferred embodiment, patient X would be identifiable from the entity details table 510.

The query would initially involve searching for the patient's name to locate the unique identifier (unless that was already known). Once the unique identifier for a patient was known, then the entire entity history table can be scanned very rapidly for any entry including the unique identifier. The strengths of the present invention will then be realized in that the output from this scan will provide a number of entries each of which carries all of the relevant information about that patient incorporated into the extracted expression bytes $I_1$ to $I_{15}$. The entire patient's record can then be "progressively queried" without recourse to any further searching operation on the main entity history table 530. Specific details of the patient's treatments, doctors, hospital admissions, prescriptions etc. are all very rapidly available at will be assertion of appropriate deterministic bytes in the expression $I_1$ to $I_{15}$.

It is noted that the event history table will include many records where the expression stored in the record contains many non-deterministic bytes. For example, where a doctor X prescribes a patient Y with drug Z, other bytes of the expression may be either not known, or not relevant. For example, the patient may have been assigned to a ward W in the hospital which could be identified by another byte. However, this venue in which the treatment took place might be: a) unknown; b) known but not relevant to the record; or c) automatically inferable from the context of the person making the record entry. Whether this information is included in the record is stipulated by the users; however, it will be noted that it does not affect the result of the query whether the byte in the entity history table relating to WARD W is deterministic or non-deterministic, because the query expression will set that relevant byte to non-deterministic unless it is stipulated as part of the query.

When the database system has extracted all of the records of the entity history table matching the query expression, it preferably saves these to a results table for further querying, or progressive browsing. For example, the results table can then be analysed to identify which treatments were made at an individual hospital or by an individual doctor by setting additional conditions on particular bytes of the query expression. Memo fields can be extracted to view comments made at the time of treatment. It can be seen that the results table formed in response to the initial query actually contains all of the information relevant to a given patient's treatment, and not just the answer to the initial query "What drugs have been prescribed to patient X" ?

In summary, the information of the database is stored in such a manner that data for a query may be extracted far more rapidly than relational database storage schemas such as those used in databases 103, and with an expression for each extracted record. The presence of this expression in the query result has an important effect. A unique reporting benefit gained is the scope for progressive querying and "interactive reporting".

When a database query is executed to provide information for a report, the answer will be made up of a number of expression records. This subset of expressions inherits all the structural information held in the main expression set.

It should be noted that in the above exemplary embodiments if a query is directed to historical aspects then the scanning is performed on the entity history table 520 but if the query is related to the present such as "How many patients are presently registered at hospital X" then expression set table 530 is scanned. As can be understood from the above, the expression set table 530 is used for referring to the logical "current state" of an entity (e.g., patient) and the entity history table 520 for referring to the logical "history state" of an entity. Although these tables are described above as separate tables, the present teachings are not limited to such a configuration. The inventors of the present application have found that these tables (entity history table 520 and expression set table 530) can easily be merged into a single table, with a flag indicating a "current state" or "history state". As can be appreciated, any scanning of this merged table will result in a results which has information on both the current state and history state of entities.

The ability to perform complex queries and sub queries in the previously described database system is best utilised through the use of a graphical user interface (GUI) such as that shown in FIG. 1 at 101. It will be understood that the present database system provides such a user interface that is useable to create a database query expression for scanning the interface database 103. To create the query expression the GUI presents at least one user selectable criterion to a user. This generated database query expression is then used to scan the interface database 102 (specifically the expression set table/entity history table or merged table) as outlined above. This use of GUIs to create a database query expression and the subsequent results of scanning the interface database with this expression is described with reference to FIGS. 5-13.

Figure 4:
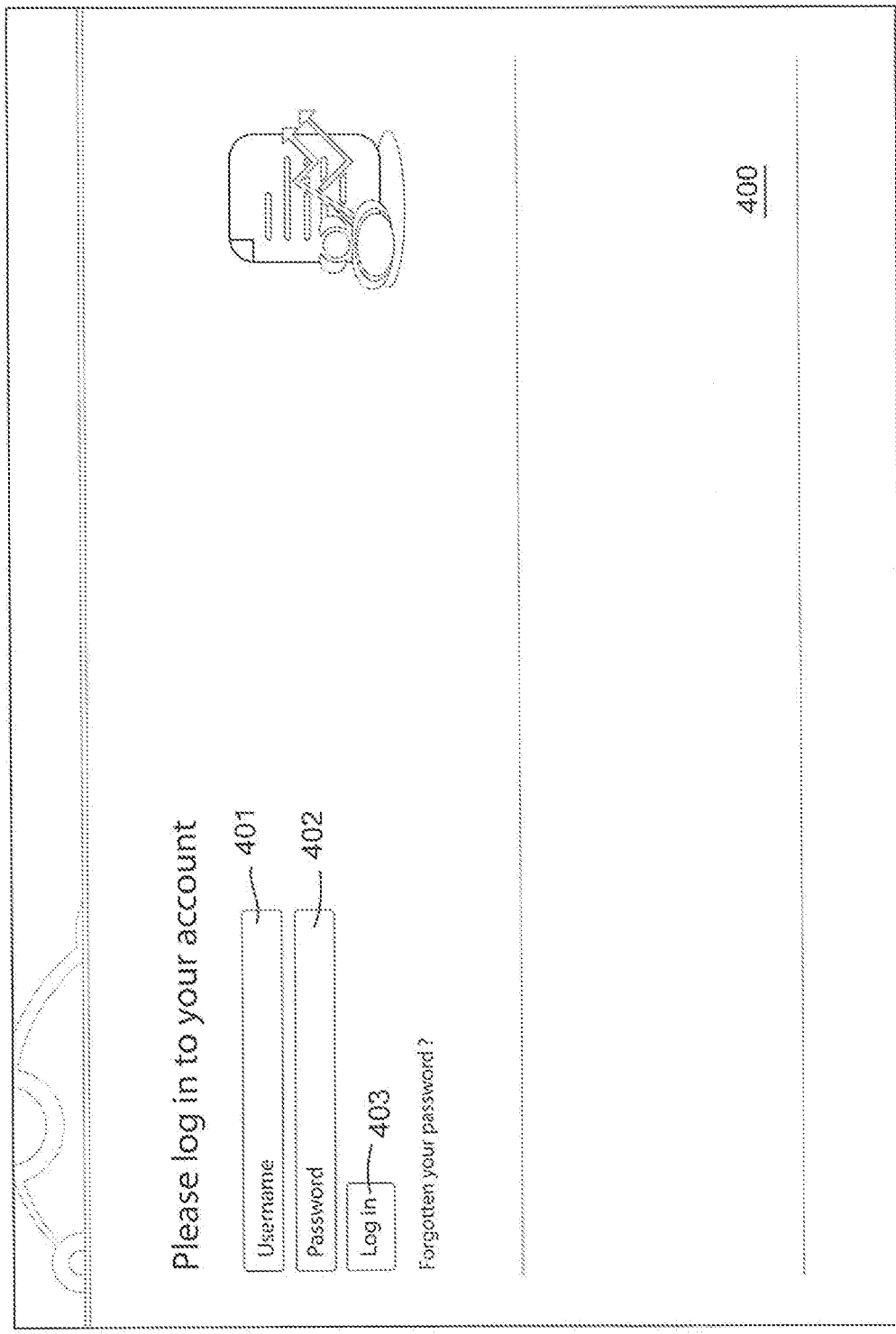
FIG. 4 shows a log in screen of the GUI in accordance with the present teachings.

FIG. 4 shows a typical login screen 400 presented to a user of the GUI. If a user enters the correct credentials in appropriate edit boxes (user name 401 and password 402 in this case) at the login screen of the GUI then access to the database system is allowed. As is well known to those skilled in the art, "logging in" allows individual access to the computer system to be controlled by identifying and authenticating the user through the credentials presented by the user. Furthermore, as the database system of the subject application is primarily intended for use with medical records of patients, ensuring that access to these records is restricted to only appropriate personnel is of the utmost importance.

Once the user is allowed access to the database system after clicking the "log in" button 403, the user is presented with a report creation screen 501 such as that shown in FIG. 5. From this screen the user can create new reports (i.e., scan the database using a query expression(s)) by selecting the "Create New Report" icon 502. Alternatively the user can view previously created reports such as the "All Visits 2012" report 503 or the "All encounters—Dr Brooker" report 504. Furthermore, the system can be set up such that these reports are run periodically. As can be appreciated this is quite useful for healthcare practitioners or administrative personnel as it allows regular monitoring/reporting using a specific database query expression corresponding to selected criteria. It will be appreciated from the following explanations and description that although the term "report" is used, the report of the present teaching is quite different to what is conventionally understood in the art.

For the purposes of the present example, the use of the group manager is of most relevance. Selection by a user of the "Group Manager" icon 605 at the top of the screen takes the user to the Group Management and Group Creation screen 600 which in this arrangement is accessible from a tabbed screen change feature of the GUI as shown in FIG. 6. In this figure, the user is presented with a plurality (in this example 8) of previously created groups but it should be understood that if a group has not been previously created the list of groups is left blank. In order to create a new group definition (i.e., perform a scan of the database using a database query expression to return specific patients) the user selects the "Create New Group Definition" icon 606 at the top right of the screen.

Figure 7A:
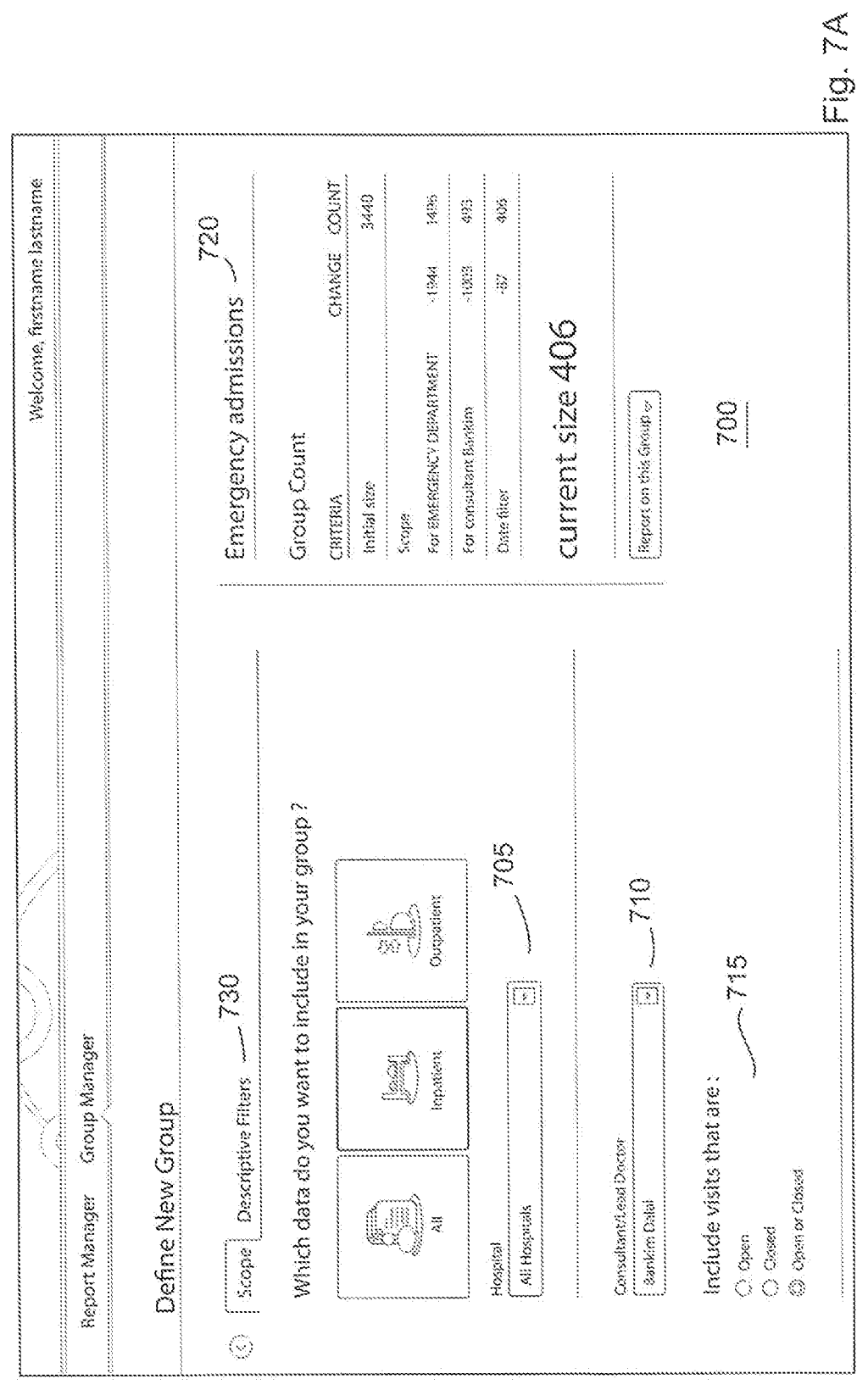

The creation of a new group definition is enabled by a dedicated interface 700 which is generated in response to activation of the "Create New Group Definition" icon 606. An example of how this will look to the user is shown in the screenshots of FIGS. 7*a* and 7*b* (these two figures appearing on one screen when presented to a user), in which selection of a plurality of criteria for use in creating the database query expression is made. Specifically a graphical user interface such as that provided by the arrangement of FIG. 7 allows the user to define scope filters 705 to include patients from all hospitals or individual hospitals, a selected doctor or all doctors 710 and a chosen time frame 715. It will be appreciated that the specifics of these scope filters is particular to the example being described and other types of scope filters could be readily defined and used as part of a different application. The scope filters are defined to present a user with displayed user selectable criteria in the form of drop down lists, icons and tick boxes. It should be appreciated that a user does not have to make a selection for each of the criteria or the user may simply be presented with a single criterion such as "Hospital". As can be well appreciated by those skilled in the art the selection of each criterion is equivalent to setting deterministic/non-deterministic bytes in the database query expression previously described. The significance of the scope filter is that it enables a user to specify relationships between registered entities (in the example given a patient seen by Doctor X at hospital Y).

The new group being created can also be given a name (usually a descriptive name) by the user in the Group Tracker section on the top right of FIG. 7a—in this case, the name "Emergency Admissions" is given to the group being created and will be visible as an icon 720 to the user.

The Group Tracker feature of the GUI is particularly useful and is made possible through the use of the aforementioned results tables. As each criterion is selected or updated, a scan is performed using the created database query expression and the results are stored in a results table. The use of the results table enables visual display to the user of the results so far and thus enables the user to visually identify those portions of the data of particular interest for further investigation. In this way the screen 700 is dynamically updated with information particular to the search query being constructed during the construct of the query. Furthermore, the user may find that the information presented in the Group Tracker is sufficient for their needs at that time and decide that there is no need to run a report in order to get the results of the query as results are presented in an on-going basis. For example in the screen shot of FIG. 7, the user is presented with information that there are 406 elements associated with the consultant Bankin in the Emergency department for the time period specified, after the Jan. 1, 2013. The inventors have found that the Group Tracker is best created from an in-memory representation of the results table. Although the Group Tracker can be implemented directly against the results table, in practice using an in-memory representation has led to performance optimisation.

The feature of "Filter by date" as shown in FIG. 7b allows a query to be performed around a specified target time frame or "width of now" ΔT. A plurality of options 725 are presented to the user in the screen of FIG. 7b as indicated by the tabs "Before", "After", "Relative" and "Between" wherein the "After" is the tab chosen in the screen of FIG. 7b. Furthermore the filtering by date is not limited to visits that occurred after a certain date but by selecting the tick boxes a plurality of further options are presented to the user such as "Started but did not finish" etc with reference to the selected date (in this case Jan. 1, 2013). Filtering by date in the group manager achieves the effect of identifying 'all individuals who had the relevant object relationships, events and characteristics within the selected timeframe.

Figure 9:
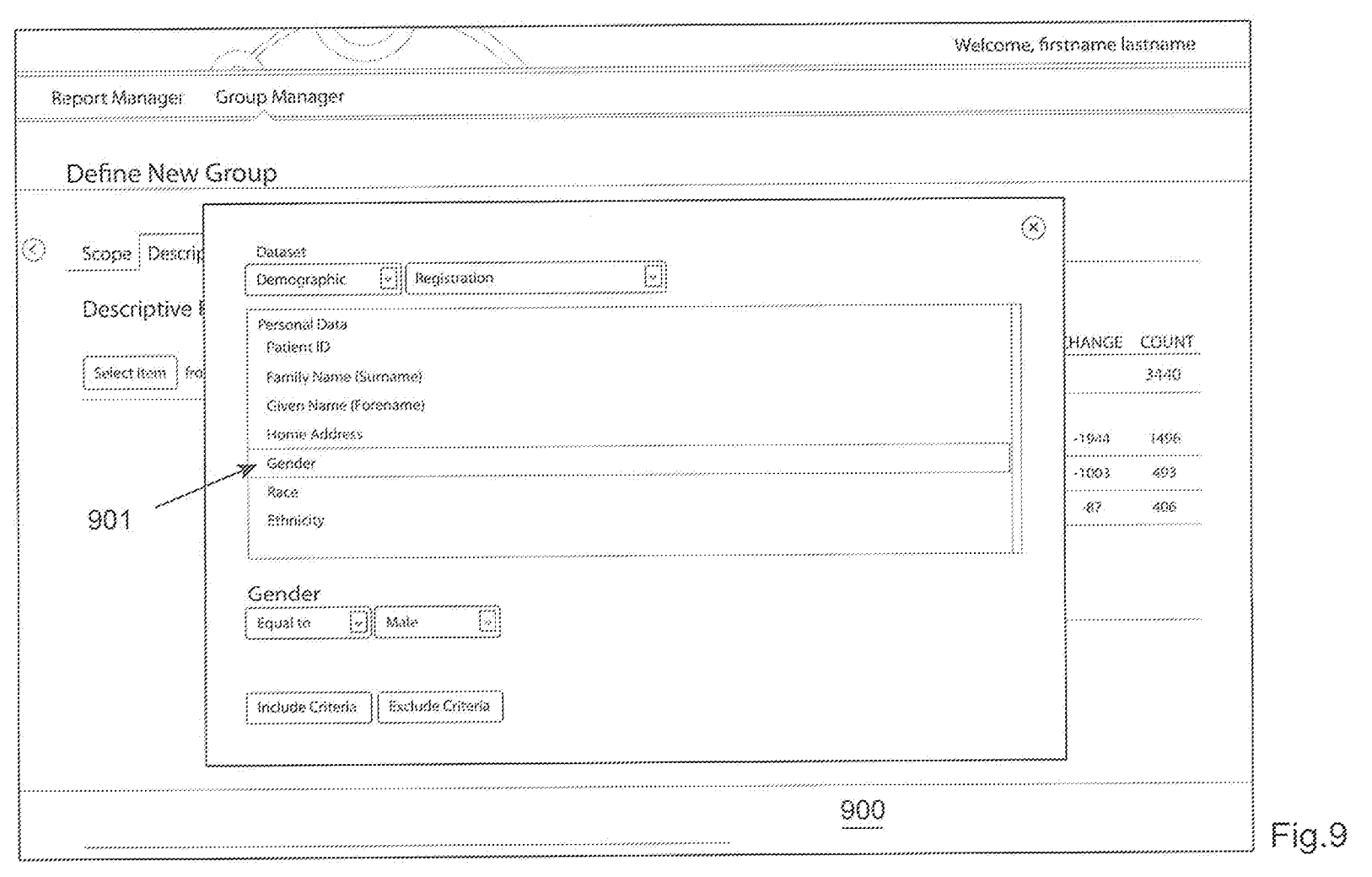

Further criteria can be selected by the user clicking on the "Descriptive Filters" tab 730 of FIG. 7a, which leads to the display such as that shown in the screenshot 800 of FIG. 8. The screen shown in FIG. 8 provides the user with an interface that allows the user to select criteria for the descriptive filters by clicking on the "Select item from a dataset" option, which in turn leads to display such as the screenshot 900 of FIG. 9 which provides a plurality of user selectable criteria 901. As illustrated in FIG. 9, a user is allowed to define the gender, diagnoses, medications, length of stay and charges. The previously mentioned scope filters contrasts with these 'descriptive filters' as the descriptive filters essentially permit the assignment and searching by attributes of entities such as doctor at hospital shown in FIG. 7 or gender of patient etc. In this way the descriptive filters provide a more granular filter definition than that provided by the scope filters. In the exemplary embodiment shown in the GUIs the attributes are patient attributes but they could equally be hospital or doctor attributes. Furthermore, the criteria 901 presented in FIG. 9 are merely examples and any of a plurality of other descriptive criteria that would be useful to the user can be added to the GUI for presentation to the user. Again, it will be appreciated that selection of each criterion in FIG. 9 is equivalent to setting deterministic/non-deterministic bytes of the database query expression. Once the user has chosen the desired descriptive filters in FIG. 9, the user can select "Include Criteria" or "Exclude Criteria". For example, the user can choose to include all genders equal to male or exclude all genders equal to male from the "Emergency Admissions" group. In the presented example, the user selects "Include Criteria" and is presented with the screen of FIG. 10.

Figure 10:
FIG. 10 shows a screen shot of the group manager feature wherein the results of applying the scope and descriptive filters are shown in accordance with the present teachings.
Figure 11B:
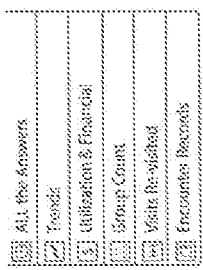

FIG. 10 shows the specific descriptive filters chosen by the user in FIG. 9 as well as an updated "Group Tracker" showing each of the descriptive filters applied to the initial size i.e., the initial group and the effect that each criteria has on the initial size. As previously mentioned the user may choose not to run a report on the created group "Emergency admissions" as the number of patients that meet the selected criteria (scope and descriptive filters) is presented in the "Group Tracker" section 720-128 patients in the present example.

Figure 12:
FIG. 12 shows a screen shot of the report manager feature wherein the group created with regard to FIGS. 4-11 is selected for reporting on in accordance with the present teachings.

If the user wishes to run a report then the "Report on this Group" drop down list is selected and a report type is chosen from the plurality of report types "All the Answers", "Trends", "Utilisation & Financial", "Group Count", "Visits Re-visited" and "Encounter Records". This is illustrated in the exemplary screen shot 1200 of a graphical user interface shown in FIGS. 11a and 11b 1 (these two figures conventionally appearing on one screen when presented to a user). In this case the user selects "Visits Re-visited" and is presented with a report manager interface 1200 for reporting on the selected group "Emergency Admissions" as illustrated in FIG. 12. A number of other options such as "Compare with" are also presented to the user in FIG. 12, which allows a user to run a report comparing one group to another.

As previously mentioned, ensuring information security and user authorization is particularly important when dealing with medical records of individuals. For example, referring again to FIG. 1, if each of the databases 103 is a database for an individual hospital or medical center then potentially a user at GUI has access to all the medical records of every patient ever treated at any of the hospitals/medical systems corresponding to databases 103. Clearly, there is a need for restriction of the data available to users in the interests of privacy and security.

Accordingly the present teachings offer a multi-level approach to address this issue. In addition to standard role and group-based permissions, the multi-character expression approach to data storage provides a flexible data-driven method of managing access to patient information at the most granular level.

Access to data by a user at GUI 101 within the above outlined system is via multi-character expression "views" of that data.

Figure 13:
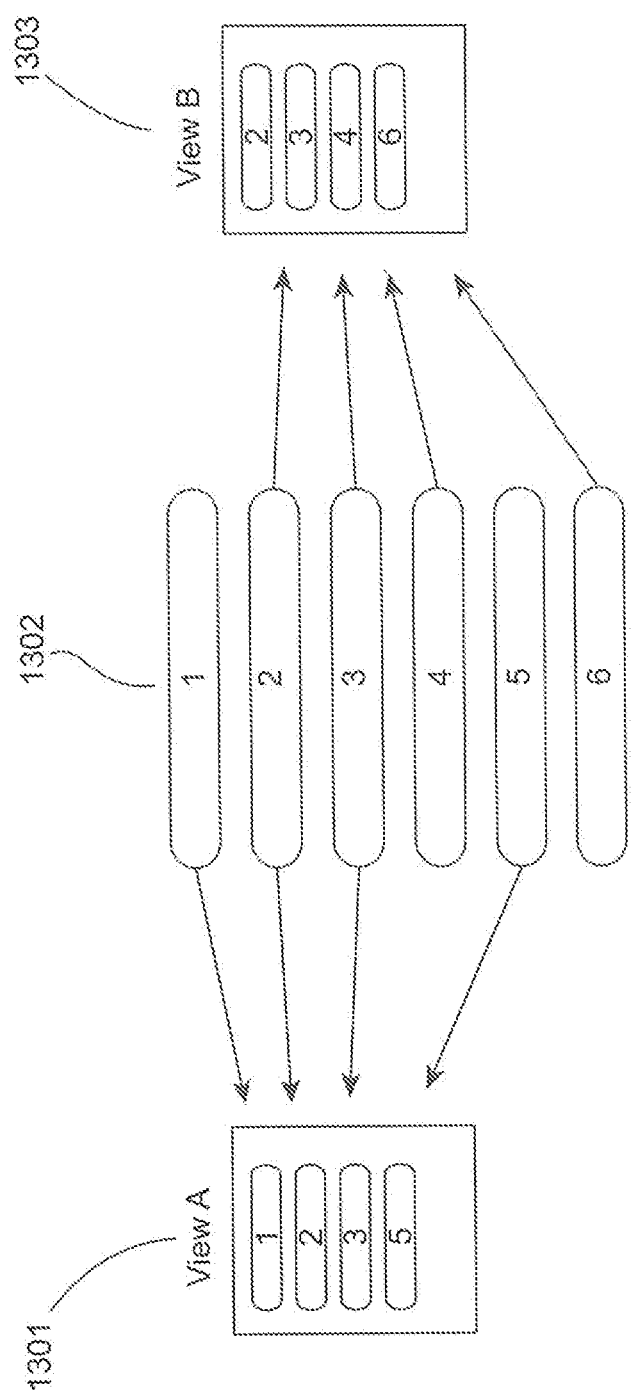
FIG. 13 shows a diagram showing two different views of data that can be assigned to a user in accordance with the present teachings.

For example, with reference to FIG. 13, a plurality of different data types 1-6 are shown at 1302. These data types 1302 are make up a complete patient record. Assuming that data type 4 is "diagnosis" and Alice has been assigned View B 1303, then Alice is authorized to view the restricted data "diagnosis". On the other hand, Bob has been assigned view A 1301 and is therefore not authorized to view restricted information "diagnosis". When viewing a patient record at GUI 101. All access to this data is via these views so at no point is the restricted data "diagnosis" available to Bob.

Information displayed in the GUI 101 is anonymous by default. For example, with reference to previously described FIGS. 4-12, although a user created a group and/or a report, the user does not know the identity of any of the patients in the group. In FIG. 13, identity data would be items 7-10 (not shown), so they do not appear in either view A or view B. Groups are selected using the user's selection from view A or B, so at no point is the identity data available to the user.

The only view that does contain identity fields is only available through an "Identity Check" report. Only the Identity Check report has access to identifying data and the use of this application is configured via role & group permissions—only authorized individuals have access. The Identify Check report feature is not described in detail in the subject application but could be accessed through the report manager for example, by selecting the Create New Report icon 502 in FIG. 5.

As will be explained further, the present teachings provide a flexible security system that allows permissions to be set on roles which are then assigned to users. This allows the creation of roles to represent projects, groups, or just related staff members that should share certain permissions. For example, this allow protected health information (or other types of sensitive data) to be restricted to certain roles, whether a user can create or view a certain kind of report, or even the minimum group count to be able to view a report.

Roles are created and managed via the GUI 101. For data protection purposes, a user is able to select which role they wish to use when logging in, which allows them to create and view reports without any exposure to protected health information. Although not shown in the figures, a screen is optionally presented to the user between the screens of FIGS. 4 and 5 where the user selects a role from the roles available to them. This role selection screen step is not displayed if the user has only one role.

Every role has an optional associated "base group" definition which acts as the basis for all groups created under that role. This base group can have any criteria selectable through the Group Manager. For example, a group set up for a "Memorial Hospital" role could be restricting reports to only those patients with a visit at that hospital. This is selected when the role is created. The base group is selected by the administrator from an existing group definition created in the usual way.

It should be noted that the scoping of roles permits not just the scoping of the people to be reported upon and the datasets to be reported upon but also a much more granular restriction on the scope of those datasets. For example, a user could define:

Base group=Males, admitted to hospital X, with Diagnosis Y, under the care of Doctor Z, seen in 2012.

Datasets/reports: a, b, c

Scope of data: Data from Hospital A, Diagnosis Y, 2009.

A simple practical example might be a doctor who wants to review what happened to a set of his patients who were previously treated at another hospital. That other hospital could allow him to look at only the data from 2009 for those patients. i.e. under this role the Doctor/user can report on all males admitted to hospital X and treated by Doctor Z in 2012; they can view whatever datasets are specified; but only view those datasets insofar as they were collected previously in a different hospital during a different timeframe.

Figure 14:
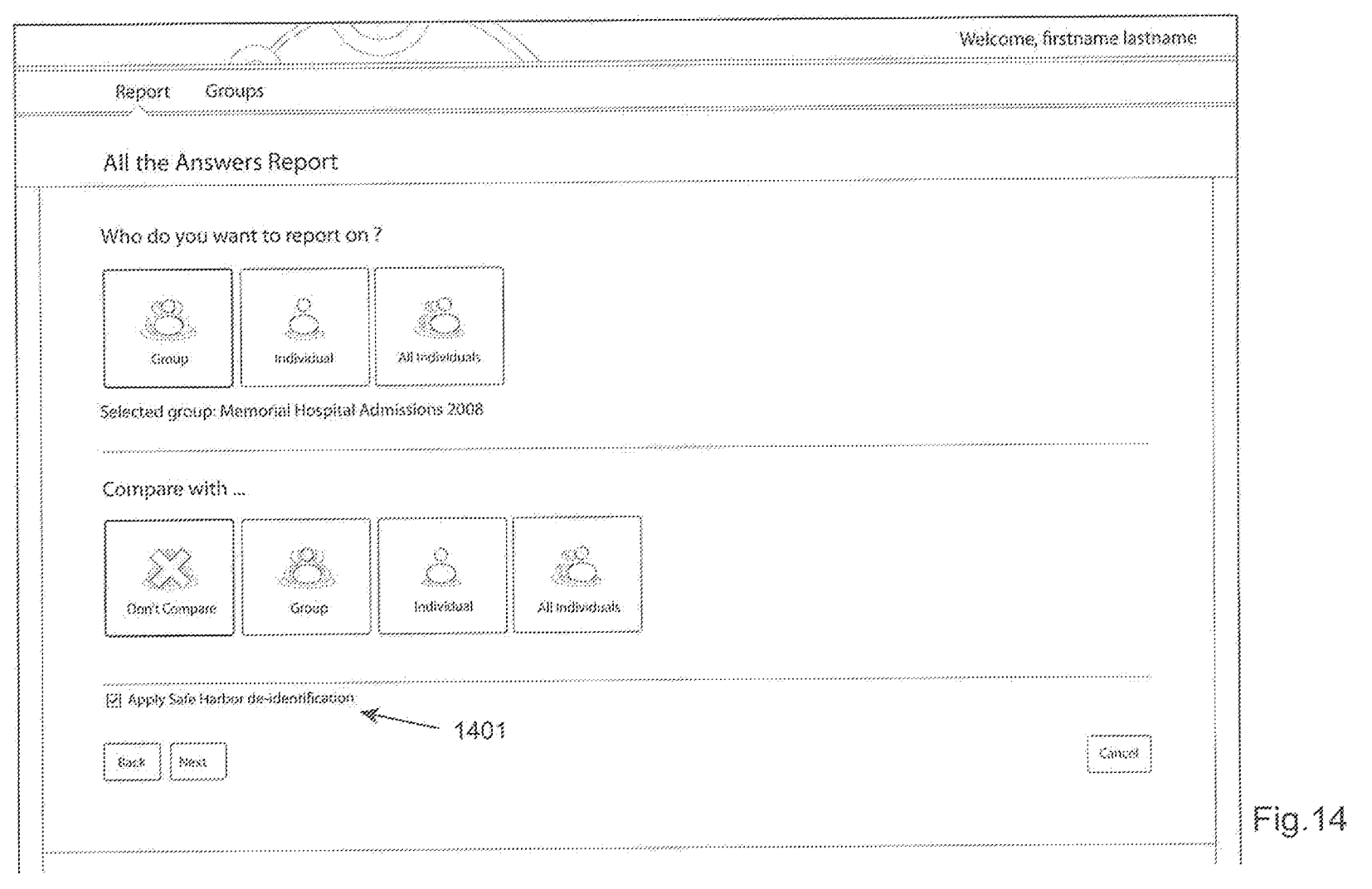
Figure 15:
FIG. 15 shows a screen shows a screen shot of the report manager feature wherein "Apply Safe Harbor de-identification" option is disabled.

All reports which could expose protected health information have an "Apply Safe Harbor de-identification" option which applies § 164.514(b)(2) of the HIPAA Privacy Rule. For example, this is shown in FIG. 14, wherein the "Apply Safe Harbor de-identification" is selected. If users are not authorized to access PHI, this option is locked or disabled so they always view de-identified information. This is shown in FIG. 15 where "Apply Safe Harbor de-identification" option is not selectable.

In addition, each role has a specified minimum group size which restricts the minimum number of individuals that users are allowed to report on. It should be understood that any privacy rule can be set depending on the jurisdiction(s) in which the system is operating or the privacy requirements of the system. The aforementioned HIPAA Privacy Rule is simply a well-known example in the US medical field.

The following describes an example of the implementation of the restricted view security feature of the present teaching.

This example system contains three datasets:

Tumor registry—generic but within the registry, there are specific data items for breast cancer Tissue typing database is generic. There are research datasets specific to BC patients.

Demographics—containing both identifiable patient details and more general characteristics, such as gender and ethnicity.

These are three roles used; an administrator, a breast cancer researcher and a melanoma researcher. While an individual may work on both projects, they can only access data for the project they are working on at the time, which is specified at log in.

TABLE 1

View Restrictions

| | Role | | |
| --- | --- | --- | --- |
| View | Breast Cancer Researcher | Melanoma Researcher | Admin |
| Tumor registry | | ✓ | x |
| Tumor registry + breast cancer details | ✓ | | x |
| Tissue typing | | ✓ | x |
| Tissue typing + breast cancer research | ✓ | | x |
| Demographics | | | x |
| Demographics (de-identified) | ✓ | ✓ | x |

From table 1, as a utility role, the administrator has no access to clinical data. Similarly, as neither group of researchers is authorized to access PHI, they only have access to the de-identified version.

TABLE 2

Role Configuration

| Application | Role | | |
| --- | --- | --- | --- |
| | Breast Cancer Researcher | Melanoma Researcher | Admin |
| Administration | | | ✓ |
| Group Manager | | | |
| Identity Check | ✓ | ✓ | |
| All the Answers | | | |
| Trends | ✓ | ✓ | |
| Visits | ✓ | ✓ | |
| Clinical Observations | ✓ | ✓ | |
| Data Export | ✓ | ✓ | |

In this scenario of table 2, nobody is authorized to access PHI, so access to applications that provides it is also restricted.

Base groups for the roles are set up as follows:

Base group definition (Breast Cancer Researcher). All patients who have the "Breast Cancer" flag set in their Demographics view.

Base group definition (Melanoma Researcher). All patients who have the "Melanoma" flag set in their Demographics view The Demographics view described here is similar to any other view associated with a patient (so could be View A 1301 in FIG. 13). In this scenario, one of the data items in this view has a term equivalent to "Is this patient in the melanoma research group?" to which the answers would be "Yes" or "No". This can then be used as one of the criteria for generating a group, meaning that only patients where the answer to "Is this patient in the melanoma research group?" is yes, will be included in the group. This group can then be used as a base group.

With the base groups configured in this way, it will appear to people with the "Breast Cancer Researcher" role that the only patients in the system (and therefore the only patients who will appear in any reports) will be breast cancer patients. For example, FIG. 6 shows two reports 603 and 604 but a user's view of these reports is based on the role of the user. Viewing each of these reports by different users each assigned a different role would likely result in the users being presented with two very different views of this report.

Figure 16:
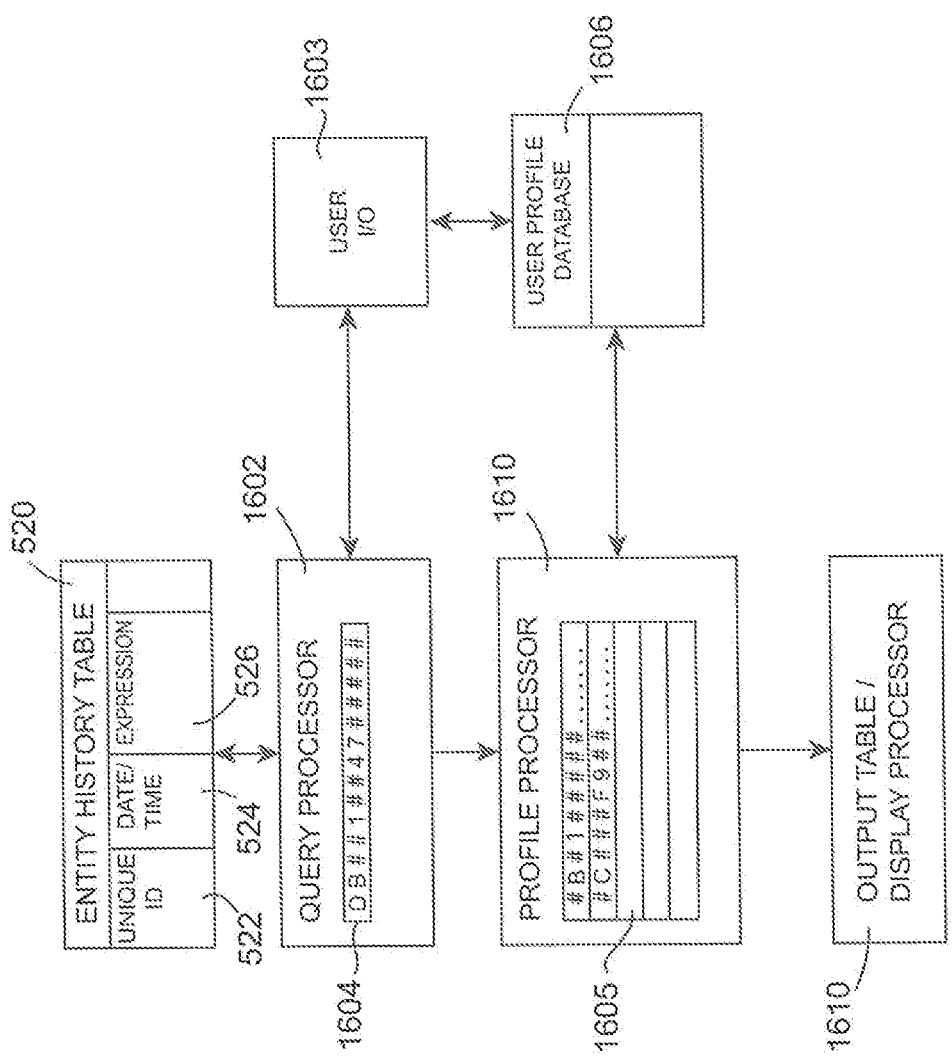
FIG. 16 show a profile processor in accordance with the present teachings.

With reference to FIG. 16, there is described a more specific implementation of the above outlined features. In particular a profile processor is provided that facilitates the input and output of queries and data to the interface database 102 according to specific requirements of information security and user authorization. The profile processor is adapted to allow or restrict different views or profiles of the data stored in the database according to the individual user, or role of the user. It should be understood that the profile processor is generally implemented in software as part of a complete database management system. Alternatively, the processor can be implemented in hardware using programmable electronic gate circuitry (e.g. uncommitted logic arrays or ASICs) and dedicated volatile and non-volatile memory.

In the present teachings, it has been recognised that the expression $I_1$ to $I_{15}$ encoded in the expression set table 530 and in the entity history table 520 (or a combination thereof) can be used not only for matching against a query expression comprising a selection of deterministic and non-deterministic characters, but also for deploying a set of profile expressions, also each comprising a selection of deterministic and non-deterministic characters, that can be used to control the output and display of search results according to the individual user.

The profile processor 1601 effectively acts as a filtration stage in conjunction with a query processor 1602. Preferably, the query processor is also implemented in software. A user input 1603 provides a query expression 1604 comprising a selection of deterministic characters and non-deterministic characters "#". With reference to FIGS. 7-9, this corresponds to the user selection of a plurality of criteria as shown in the screenshots of these figures. Records (results of scanning with the query expression) will be extracted from the entity history table 520 by the query processor 1602 whenever a match of every deterministic character in the query expression 1604 matches a corresponding deterministic character in the expression field 526 of the entity history table 520. Extracted records will be passed through to the profile processor stage 1601.

The profile processor 1601 obtains a series of user profile expressions 1605 from a user profiles database 1606, according to the identity of a user logged into the system, or according to the role of user logged into the system. It will be appreciated that the use of user profiles database 1606 allows permissions to be set on roles which are then assigned to users. As previously mentioned, roles are created and managed via the GUI 101. Each of these user profile expressions 1605 comprises a set of deterministic characters and nondeterministic characters. The user profile expressions define deterministic fields of the expressions extracted by the query processor that must match the extracted records in order to allow the record to be passed through to the display. In the preferred embodiment, the set of user profile expressions 1606 filter the extracted records on a Boolean OR basis, i.e. for each extracted record there must be a match with at least one of the user profile expressions. It will be understood, however, that an alternative record filtration basis would be to filter the extracted records on a Boolean AND NOT basis, i.e. for each extracted record, there must be no deterministic character matches with any user profile expression. In this case, the user profile expressions would define areas of the database to be excluded.

As an illustration, there may be five general classes of views. A "discipline view" may be provided for each user discipline, such as "nurse", "doctor", "hospital administrator", etc. These views will filter for different sets of data, according to the requirements of the discipline. Similarly, a "specialist view" may be provided for each sub-group of the disciplines, e.g. the class "doctor" may have optional specialist views of "cardiac specialist", "ENT specialist" etc in which different levels of detail of information are filtered by the profile processor. Another class of view, the "perspective view", may present the same essential information, but use a different sub-table the natural language terms-a perspective view for separate groups of persons, such as "doctor" and "patient" can be provide so that each class of person can see the data presented in a comprehensible format.

Note that although the illustrative embodiment shows the query processor as the first record extraction stage from entity history table, and the profile processor as the second stage, it will be understood that these two operations could be reversed, although this would be very much less efficient.

In summary, the above described database system and graphical user interfaces provide numerous advantages over the prior art. Information of the database is stored in such a manner that data for a query may be extracted far more rapidly than relational database storage schemas, and with an expression for each extracted record. The presence of this expression in the query result has an important effect. A unique reporting benefit gained is the scope for progressive and complex querying. The reporting or querying benefit allows a graphical user interface with an array of user selectable criteria to be provided to the user such that complex and progressive queries can be easily performed.

When a database query is executed to provide information for a report, the answer will be made up of a number of expression records. This subset of expressions inherits all the structural information held in the main expression set.

It will be understood that the database querying essentially requires byte wide comparison of the expressions $I_1$ to $I_n$ ($I_1$ to $I_{15}$ simply used as an example above). An extremely fast coprocessor ASIC could thus be manufactured which includes up to n eight-bit comparators in parallel. In practice, querying would never require all fifteen bytes to be compared, as most queries involve the setting of a large number of the bytes to a non-deterministic state, thus in practice requiring fewer parallel circuits and enabling simplification of the design of a dedicated co-processor. This allows near instantaneous results at the graphical user interface.

While it is not intended to limit the present teaching to any one specific arrangement it will be appreciated that multiple types of queries that were heretofore difficult to generate in a simple user interface may now be provided. For example it is possible to progressively generate a plurality of queries to extract data from the database, a first query providing a subset of the plurality of unique, multi-character expressions, the subset being used to create a dataset in a results table for interrogation by a second query. Another arrangement is generating a user query in the form of a syntactically correct statement, the database system being configured to interrogate the user query and transform the user query to identify one or more of the plurality of unique, multi-character expressions which satisfy the query. A further arrangement may provide storing a plurality of individual unique, multi-character expressions having data related to a specific person and parsing the plurality of unique, multi-character expressions to extract information not wholly stored in any one of the unique, multi-character expressions. Another arrangement may provide storing a plurality of individual unique, multi-character expressions having data related to a specific event and parsing the plurality of unique, multi-character expressions to extract information not wholly stored in any one of the unique, multi-character expressions and defined within a queried data window.

In addition, although not described in detail in the present application the graphical user interface also allows a user to input records to the database.

It is also possible in accordance with the present teaching to provide a controlling of the output of a display of search results according to "event views" and "key views" or indeed to provide a profile of a user of the system and then controlling the output of display of search results according to the individual user.

While it is not intended to limit the present teaching to any one specific implementation it will be appreciated that the architecture is typically a distributed architecture where the database is provided as a cloud database.

The words "comprises/comprising" and the words "having/including" when used herein with reference to the present invention are used to specify the presence of stated features, integers, steps or components but does not preclude the presence or addition of one or more other features, integers, steps, components or groups thereof.

The present teaching is not limited to the embodiments hereinbefore described but may be varied in both construction and detail.

We claim:

1. A method of querying a database system, the database system comprising at least one database populated with a plurality of unique, multi-character expressions associated with data entities of the at least one database, the method comprising:

providing an interface database, the interface database populated with a plurality of unique, multi-character expressions associated with data of the at least one database providing a graphical user interface for receiving at least one input selection from a user defining a database query expression wherein the database query expression comprises characters which correspond to the expressions stored in the interface database, the characters of the database query expression including deterministic characters and non-deterministic characters;

scanning the at least one database with the database query expression to obtain a first set of results, wherein performing a query comprises parsing the interface database using the database query expression to match the deterministic characters and ignore the other characters and wherein performing a progressive query comprises replacing at least one non-deterministic characters of the database query expression with a deterministic character and scanning a portion of the interface database identified by a result of a previous query using the modified data query expression;

parsing the first set of results with a user profile expression associated with the user to obtain a second set of results, the user profile expression comprising a unique, multi-character expression; and displaying the second set of results in the graphical user interface wherein the user profile expression defines a role of the user and associated permissions, the method comprising creating a role associated with the user, the creating a role comprising selecting permissions for the role at the graphical user interface which modifies bytes of the user profile expression to define the role associated with the user.

2. The method of claim 1 further comprising providing a display at the graphical user interface that presents the user with at least one role for selection.

3. The method of claim 1 wherein creating the role comprising setting permission for the role such that the role has an associated base group and set permissions limit the user to viewing data on individuals in the base group.

4. The method of claim 1 wherein the at least one database comprises a plurality of databases.

5. The method of claim 4 wherein at least two of the plurality of databases differ in their database management system, each database management system defining a set of programs that enable a user to store, modify, and extract information from the respective database.

6. The method of claim 5 further comprising using the interface database to allow a user to access data stored in the plurality of databases without using the database management system specific to the plurality of databases.

7. The method of claim 1 further comprising converting the data stored in the at least one database into unique, multi-character expressions for storage in the interface database.

8. The method of claim 7 comprising iteratively accessing data within the at least one database to convert data not already converted and stored as unique, multi-character expressions in the interface database to unique, multi-character expressions for storage in the interface database.

9. The method of claim 8 comprising updating the interface database on a determination that one of the plurality of databases has been updated.

10. A database system comprising:
- at least one database populated with a plurality of unique, multi-character expressions associated with the data entities of the at least one database;
- an interface database, the interface database populated with a plurality of unique, multi-character expressions associated with data of the at least one database;
- a profile processor capable of executing instructions embodied as software portions and communicatively coupled to the interface database and the at least one database; and
- a graphical user interface for receiving at least one input selection from a user defining a database query expression, wherein the database query expression comprises characters which correspond to the expressions stored in the interface database, the characters of the database query expression including deterministic characters and non-deterministic characters, wherein
- the database system is configured to execute software portions to scan the at least one database with the database query expression to obtain a first set of results, wherein performing a query comprises parsing the interface database using the database query expression to match the deterministic characters and ignore the other characters and wherein performing a progressive query comprises replacing at least one non-deterministic characters of the database query expression with a deterministic character and scanning a portion of the interface database identified by a result of a previous query using the modified data query expression,
- parse the first set of results with a user profile expression associated with the user to obtain a second set of results, the user profile expression comprising a unique, multi-character expression defining a role and permissions for that role, the permissions for the role modifying bytes of the user profile expression to define the role associated with the user, and
- display the second set of results in the graphical user interface.

\* \* \* \* \*